United States Patent [19]

Kallaes et al.

[11]  4,252,456
[45]  Feb. 24, 1981

[54] COUPLING DEVICE

[75] Inventors: Elis Kallaes; Karl-Erik Starell, both of Orsa, Sweden

[73] Assignee: Orsa Kattingfabrik AB, Orsa, Sweden

[21] Appl. No.: 4,933

[22] Filed: Jan. 19, 1979

[30] Foreign Application Priority Data

Jan. 20, 1978 [SE] Sweden ........................ 7800734

[51] Int. Cl.³ .................... F16D 1/12; B25G 3/36; F16B 7/18
[52] U.S. Cl. .................... 403/110; 403/393; 403/343
[58] Field of Search ............ 403/27, 33, 106, 107, 403/110, 339, 340, 341, 393, 396, 343

[56] References Cited

U.S. PATENT DOCUMENTS

| 1,484,622 | 2/1924 | Claus | 403/393 X |
| 1,985,582 | 12/1934 | Schwinger | 403/393 X |
| 2,185,782 | 1/1940 | Brittin | 403/110 X |
| 3,586,353 | 1/1969 | Lorenz | 403/343 X |

Primary Examiner—James Kee Chi
Attorney, Agent, or Firm—Christie, Parker & Hale

[57] ABSTRACT

A coupling device for container lashings comprises two tensioning members (1, 3; 11, 13) having coacting teeth (2, 12) and a clamping means (20) for keeping the members with the teeth (2, 12) in mesh. One flank of the teeth (2, 12) inclines at an angle (α) of between 95° and 110° to the tensional load direction (r̄) of the member. The other flank of the teeth inclines at an angle (α) of between 30° and 50° to the tensional load direction (r̄). The clamping means (20) is an eccentric clamping collar, surrounding the members (1, 11) in their toothed zone and in an open condition affording a clearance (s) between the top land planes of the elements (1, 11) in the same order of magnitude as the tooth depth (t) but in a closed condition the collar (20) maintains the teeth (2, 12) of the members in mesh. Each of the members have means (4, 14) against which a tensioning apparatus (30), e.g. a hydraulic tensioner can be applied.

The collar (20) has an eccentric operating lever (29), the angular attitude of which indicates the closed or open state of the collar (20).

13 Claims, 5 Drawing Figures

Fig. 3
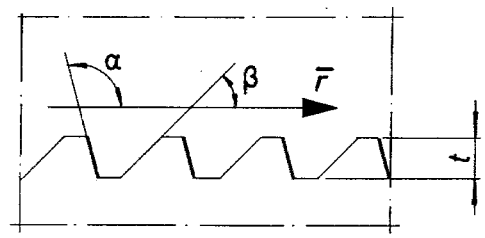
Fig. 4
Fig. 5
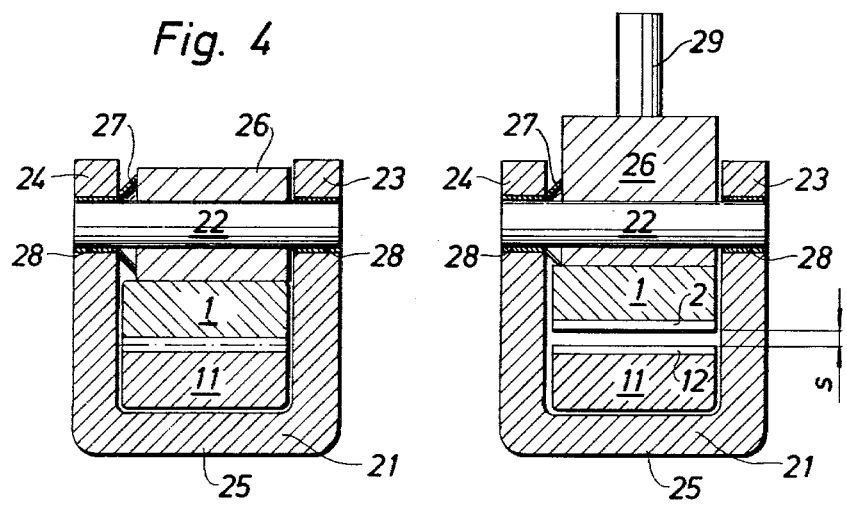

COUPLING DEVICE

BACKGROUND OF THE INVENTION

The invention relates to a coupling device comprising two tension members having mutually coacting teeth and a clamping means for keeping the toothed members in mesh with each other.

In lashing containers to the deck of a ship a pair of lashing members is often used. The members (chains or tension bars) are fastened to the deck and a container respectvely, and are tensioned and connected by means of a shroud screw or a lever arm tensioner. Shroud screws are expensive, easily damaged and slow to operate. Lever arm tensioners require high manual strength to tighten and are risky to release. Should the lashing members be tensioned by means of a separate tensioner and then in tensioned condition be coupled by means of a coupling of the type revealed in U.S. Pat. No. 1,652,677, several drawbacks would occur. The U.S. patent reveals a coupling which comprises two connector portions with toothed shanks, the teeth of which are locked in mutual engagement by means of transverse screwed connections extending through the shanks. For example, the teeth can take up a position top-to-top when the screwed connection is tightened, resulting in the risk that the lashing becomes slack or has no effect when loaded.

Before the departure of a vessel, a ship's officer, usually the second mate, must ensure that the lashings are effective, but an inspection of the known coupling devices is time-consuming, since they do not give any clear indication as to whether the teeth are mutually locked in engagement or not.

Furthermore, it takes time and energy to release and tighten the screwed connection.

Another disadvantage is that there have been difficulties in handling couplings of larger sizes/weights in connection with tensioning and releasing lashings.

SUMMARY OF THE INVENTION

One object of the invention is therefore to provide a coupling device of the kind mentioned in the introduction, by means of which the disadvantages and difficulties discussed are overcome, and which allows lashings to be more easily and quickly released or tightened.

In accordance with the invention, this object is achieved in a coupling device of the kind given in the introduction in that one flank of the teeth has an angle of between 110° and 91° to the direction of tensional load in the member, that the other flank has an angle of between 30° and 50° to the directional tensional load, that the clamping means is an eccentric clamping collar surrounding the members at their toothed zones and affording clearance between the tooth top planes of the members, which is of the same order of magnitude as the depth of the teeth, that the clamping collar keeps the teeth of the elements in mesh when it is closed, that the clamping collar has an eccentric operating lever, the angular attitude of which indicates whether the collar is open or closed, and that each of the members is provided with means for applying a tensioning apparatus, e.g. a hydrualic tensionor.

The flank angles of the teeth are preferably about 105° and 45°. The flank angle 45° enables mutually relative axial displacement of the members in such a way that the effective length of the coupling device is reduced without any great labor. If this flank inclination were steeper, it would be difficult to axially displace the members for reducing the effective length of the device. Were this angle shallower the pitch of the teeth would become large to the point of clumsiness, since for practical reasons a tooth depth of some millimeters is desired in devices of the type to which the invention relates. The other tooth flank angle (preferably about 105°) should be close to 90°, since coacting tooth faces would otherwise exercise a wedging action which would unfavorably affect the eccentric clamping collar. This flank angle should be greater than 95° however, since it would otherwise be difficult and risky to open the coupling device when the lashing is to be released. If the flank angle is 90° or somewhat greater, one would be compelled to work on the coupling device to get the teeth to go free from each other, so that the members could be mutually relatively displaced. With the flank angle preferred in accordance with the invention, it has been found that the members move away from each other in a more controllable way when the clamping collar is opened.

As the clamping means is made as an eccentric clamping collar, special tools for coupling and releasing the members are no longer needed. The reason for this is that the eccentric cam forming a part of the clamping collar is provided with an operating lever which can simply and manually be pivoted to close and open the collar, the angular attitude of the operating lever in relation to the coupling device indicating whether the device is open or closed. A ship's officer with the task of checking lashings can now make a check from a comparatively distant position to see what angular attitude the operating lever has.

Each of the members are suitably provided with a stop at their rear ends in the direction of tensional load, these stops coacting with the clamping collar to prevent the members from leaving the collar. As mentioned, the clamping collar can be formed as a yoke with an eccentric cam on a shaft which is mounted at the free ends of the yoke, the operating lever being connected to the eccentric cam. At their front ends in the direction of tensional load, the members suitably have connecting means, preferably a hook for hooking fast the ring of a chain or the like. A conical disk spring or the like can be mounted between one limb of the yoke and the eccentric cam for providing a certain amount of friction between the eccentric cam and the yoke so that the eccentric cam does not rotate, e.g. under the action of gravity.

The invention is defined in the accompanying patent claims. In the following, the invention will now be described in the form of an example while referring to the accompanying drawing.

BRIEF DESCRIPTION OF THE DRAWINGS

FIG. 3 is a detail of the tooth arrangement.

FIG. 4 is a section taken along the line IV-IV in FIG. 1 through the clamping collar in a closed condition.

FIG. 5 shows a section corresponding to that in FIG. 4 but with the clamping means in an open condition.

DETAILED DESCRIPTION

Figure 1:
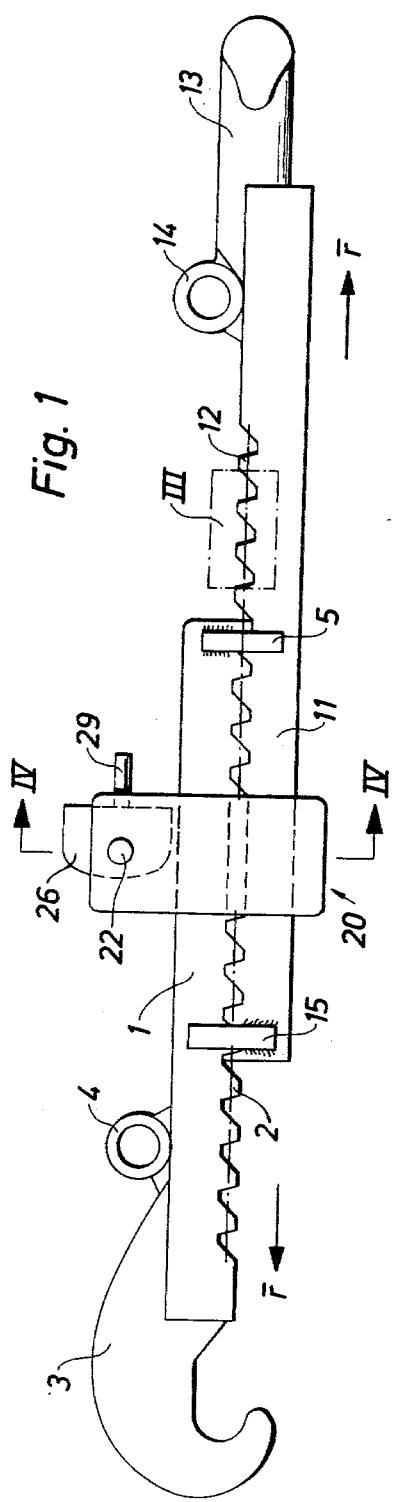
FIG. 1 is a side view of a coupling device in accordance with the invention.

A coupling device is shown in FIG. 1, comprising two coupling members which are mutually connectable by means of an eccentric clamping 20. The coupling members are essentially identical and comprise a flat bar 1, 11 with teeth 2, 12 extending across the longitudinal direction of the bar 1, 11. At one end of the bar 1, 11 there is a hooking means 3, 13, in the vicinity of which a pipe length 4, 14 is also rigidly attached to the bar. At the other end of the bar 1, 11 there is a stop 5, 15, preventing the members from being pulled out of the eccentric collar 20. The stops 5, 15 can be so made that they extend from one coupling member over the side portions of the other coupling member to prevent the members from splaying for a skew load in the plane of the teeth 2, 12. These stops 5, 15 can possibly be arranged on both sides of the end of the bar.

Figure 2:
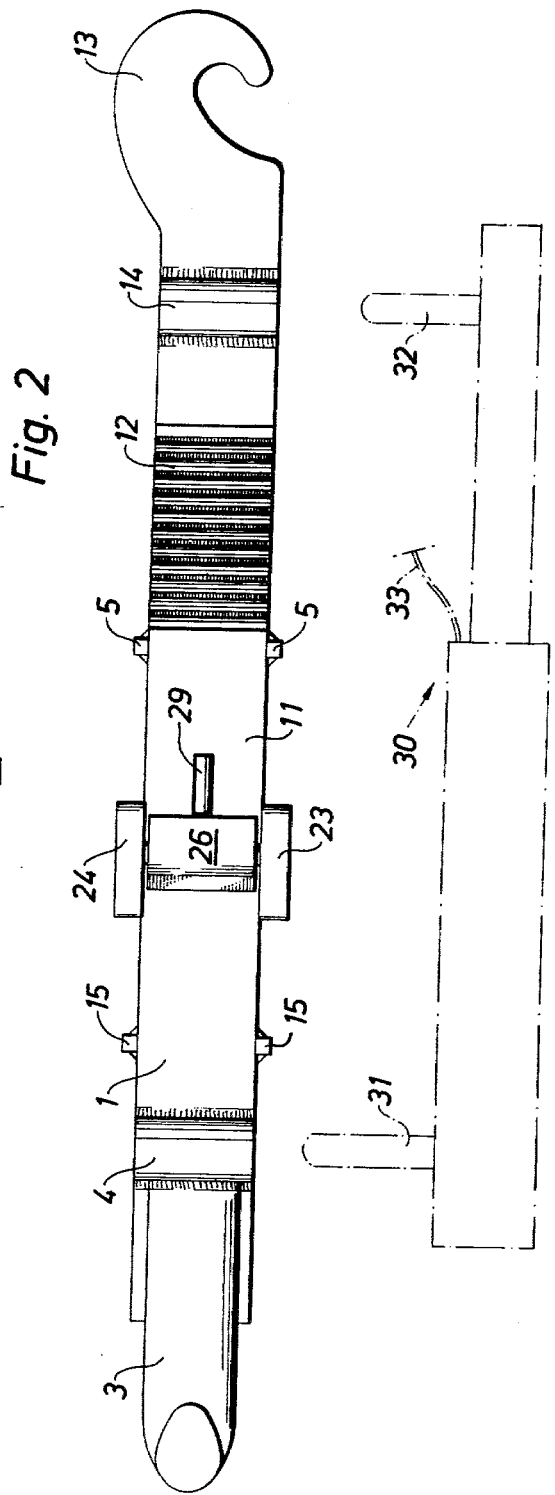
FIG. 2 is a horizontal view of the device in Fig. 1, further schematically illustrating a tensioning apparatus for tensioning the device.

The eccentric clamping collar 20 is shown in a closed condition in FIGS. 1 and 2, the teeth 2, 12 meshing accordingly.

A hydraulic tensioning apparatus 30 is shown in chain lines below the coupling device in FIG. 2. The cylinder part of the tensioner is provided with a transverse pin 31, and its ram portion is provided with a pin 32, these pins being disposed for accomodation in the pipe lengths 4, 14 of the coupling device. A pipe 33 is provided for supply and return of hydraulic medium, With the aid of the tensioner 30, the elements can be mutually, axially relatively displaced when the collar 20 is open, so that the hook portions 3, 13 approach each other.

FIG. 3 illustrates the form of the teeth 2, 12. $\bar{T}$ denotes the respective tensional load direction of the elements, and this is also apparent from FIG. 1. The flanks of a tooth have different slopes. The steeper flank has an angle $\alpha$ to the load direction which is more than 90° but less than about 110°. The angle $\alpha$ is preferably between 95° and 110°, most expediently about 105°. The more obtuse flank angle $\beta$ is between 30 and 50° and is preferably about 45°.

In a practical embodiment of the illustrated coupling device, where it has a length of about 1.2 m, a breaking load of 30 tons and a weight of about 11 kgs, a tooth depth t of about 3 mms was found to be suitable, and it was also found to be suitable to plane off the tops in the way shown in FIG. 3.

FIG. 4 is a section through the eccentric clamping collar 20. The collar 20 comprises a yoke 21 with a web 25 and two substantially parallel limbs 23 and 24. At the free ends of the limbs 23, 24 a shaft 22 is mounted by means of bearings 28. An eccentric cam 26 is rigidly mounted on the shaft 22. A conical disc spring 27 is arranged between the cam 26 and the limb 24 to stabilize the cam 26 in its set portion. As is apparent from FIGS. 1, 2 and 5, the cam 26 is provided with an operating arm 29 to facilitate its manual setting in the open and closed position.

The collar 20 is shown in its closed position in FIG. 4, the cam 26 maintaining the teeth of the bars 1, 11 in mesh between the yoke and shaft. FIG. 5 shows the collar 20 in an open position. The eccentricity of the cam 26 is such that in the open position it allows the bars, 1, 11 to be moved apart so that there is a clearance s between the tooth top planes of the bars 1, 11, this clearance being of the same order of magnitude as the tooth depth t, i.e. about 3 mms in the embodiment discussed. The tooth angles $\alpha$, $\beta$, depth t and clearance s afford substantial advantages. When the coupling members are to be pulled together axially, the flank angle $\beta$ is such that the teeth easily become unmeshed under the action of the tensioner 30 or a manual tensioning force. The lower value of the angle $\beta$ is determined by the desire of not having too large a tooth pitch. The flank angle $\alpha$, locking the members relative to each other against a separating force, allows on the one hand, but because of its small slope, the members are enabled to separate from each other when a loaded coupling (the loading can attain several tons) is released by opening the collar. We have thus found that the angle $\alpha$, surprisingly enough, affords a substantially automatic, unhindered separation of the members, and unloading of the coupling when the eccentric clamping collar 20 is opened while the coupling is under load. The relation of the clearance s to the tooth depth affords the advantage in connection with the flank angle $\alpha$ of allowing said separation of the members, but also that the coupling members are actually kept coupled against axial extension when the collar 20 is open and the members are subjected to a tensional load of comparatively small size. Such a load occurs under the action of the weight of a coupling member and the details connected to it, such as chains or the like. The reason for the axial lock with small loads and open collar 20 would appear to be that the members 1, 11 in all probability assume a small angle to each other for small loads. Since the collar 20 only permits the small clearance s in an open condition, the teeth will thus mesh. When the tensioner 30 is connected to the bars 1, 11 and is contracted, the tooth faces with the angle $\beta$ will ride over each other without disturbing resistance. Since the angle $\alpha$ is comparatively close to 90°, the wedging action against the shaft 22 of the collar 20 of the tooth faces with this angle will be small.

The operating arm 29 of the cam 22, which preferably is disposed so that it is directed perpendicular to the longitudinal direction of the coupling device when the collar 20 is open, and parallel to said direction when the collar is closed, gives a clear visual indication even when observed from a relatively long distance, as to the open or closed state of the collar, an advantage being that the teeth 2, 12 are securely in mesh when the arm 29 indicates the closed condition of the collar 20.

What is claimed is:

1. A coupling device comprising two tensioning members having coacting teeth, each tooth having first and second opposing flanks, and a clamping means capable of maintaining teeth of each member in mesh, characterized in that the first flank of each tooth inclines at an angle between about 90° and 110° to a tensional load direction of the members, the second flank of each tooth inclines at an angle between about 30° and 50° to the tensional load direction, the clamping means is a clamping collar having an eccentric collar cam, said collar surrounding the two tensioning members, and in an open condition, the cam affords a clearance between the tensioning members to permit adjusting the position of one tensioning member relative to the other, and in a closed condition, the cam maintains teeth of the tensioning members in mesh, each member having means for attaching thereto a tensioning apparatus, said cam having an operating lever, the angular attitude of which indicates the closed or open condition of the collar.

2. A device as claimed in claim 1 wherein the tensioning members include stop means coacting with the clamping collar for preventing the removal of the tensioning members from the collar.

3. A device as claimed in claim 1 wherein the clamping collar is in the general form of a yoke having depending limbs and having an eccentric cam pivotally mounted between the extremities of the limbs.

4. A device as claimed in claim 1 wherein the first flank is inclined at an angle of about 105° to the tensional load direction of a member, and the second flank is inclined at an angle of about 45° to said tensional load direction.

5. A coupling device comprising:
two engageable tensioning members for maintaining a tensional load in a tensional load direction, said members having coacting teeth, each tooth having first and second opposing flanks; and
clamping means for maintaining teeth of one member in mesh with teeth of the other member, the second flank of each tooth being inclined at an angle between 30° and 50° to the tensional load direction of the members.

6. A device as claimed in claim 5 wherein the first flank of each tooth is inclined at an angle between 90° and 110° to the tensional load direction.

7. A device as claimed in claim 5 wherein the clamping means is a clamping collar having an eccentric cam, said collar substantially surrounding the two tensioning members, and in an open condition, the cam provides a clearance between the tensioning members to permit adjusting the position of one of the tensioning members relative to the other, and in a closed position, the cam maintains teeth of the tensioning members in mesh.

8. A device as claimed in claim 7 wherein the cam includes an operating lever, the angular attitude of which indicates the closed or open condition of the collar.

9. A device as claimed in claim 5 wherein the second flank angle is 45°.

10. A device as claimed in claim 6 wherein the first flank angle is 105°.

11. A device as claimed in claim 5 including stop means for preventing the tensioning members from removal from the clamping means.

12. A device as claimed in claim 5 wherein each tensioning member is formed of a substantially flat rectangular bar, said teeth being recessed in and lying laterally across a face of said retangular bar.

13. A coupling device comprising:
a plurality of engageable tensioning members for maintaining a tensional load in a tensional load direction, said members having cooperating teeth adapted to resist separation of the tensioning members when the members are under a tensional load and the teeth are meshed and to provide substantially unhindered sliding separation of the members along a portion of the teeth when the position of the members relative to each other is adjusted in a direction opposite to the tensional load direction; and
clamping means for maintaining teeth of one member in mesh with teeth of the other member.

* * * * *

UNITED STATES PATENT AND TRADEMARK OFFICE
CERTIFICATE OF CORRECTION

PATENT NO. : 4,252,456

DATED : February 24, 1981

INVENTOR(S) : Elis Kallaes; Karl-Erik Starell

It is certified that error appears in the above—identified patent and that said Letters Patent is hereby corrected as shown below:

[57] Abstract, Line 7, "($\alpha$)" should read -- ($\beta$) --.
Column 1, Line 12, "respectvely" should read
-- respectively --; Line 63, "hydrualic" should read
-- hydraulic --; Line 63, "tensionor" should read
-- tensioner --. Column 2, Line 56, "drawing" should be
-- drawings --. Column 3, Line 5, after "clamping"
insert -- collar --; Line 26, "accomodation" should read
-- accommodation --; Line 28, "medium," should read
-- medium. --.

Signed and Sealed this

Twenty-sixth Day of May 1981

[SEAL]

Attest:

RENE D. TEGTMEYER

Attesting Officer

Acting Commissioner of Patents and Trademarks